United States Patent [19]

Shimizu et al.

[11] Patent Number: 5,336,960
[45] Date of Patent: Aug. 9, 1994

[54] GYROSCOPE USING CIRCULAR ROD TYPE PIEZOELECTRIC VIBRATOR

[75] Inventors: Hiroshi Shimizu; Tetsuo Yoshida; Chikara Mashiko, all of Sendai, Japan

[73] Assignees: Tokin Corporation; Hiroshi Shimizu, both of Miyagi, Japan

[21] Appl. No.: 53,963

[22] Filed: Apr. 27, 1993

Related U.S. Application Data

[63] Continuation of Ser. No. 800,481, Nov. 29, 1991, abandoned.

[30] Foreign Application Priority Data

Nov. 29, 1990 [JP] Japan .................. 2-335987
Jan. 25, 1991 [JP] Japan .................. 3-023844
Feb. 27, 1991 [JP] Japan .................. 3-053721

[51] Int. Cl.$^5$ .................. H01L 41/08
[52] U.S. Cl. .................. 310/369; 310/366; 310/359
[58] Field of Search .................. 310/358, 359, 366, 369; 73/504, 505; 74/5.6 D, 5.6 E

[56] References Cited

U.S. PATENT DOCUMENTS

| | | | |
|---|---|---|---|
| 1,861,862 | 6/1932 | Hund | 310/365 |
| 4,489,609 | 12/1984 | Burdess et al. | 310/366 |
| 4,655,081 | 4/1987 | Burdess | 310/369 |
| 5,081,391 | 1/1992 | Owen | 310/328 |

FOREIGN PATENT DOCUMENTS

| | | | |
|---|---|---|---|
| 0153189 | 8/1985 | European Pat. Off. | |
| 3926504 | 2/1990 | Fed. Rep. of Germany | |
| 2-36766 | 2/1990 | Japan | 310/357 |
| 2111209 | 6/1983 | United Kingdom | |

OTHER PUBLICATIONS

Article entitled "Vibrator Gyro Using a Piezoelectric-Ceramic Bending Bar With Interdigital Electrodes" by Shigeru Oyama, Yasuhiro Yamayoshi and Hiroshi Shimizu, published in Technical Report of the Institute of Electronics, Information and Communication Engineers, Sep. 21, 1987, vol. 87, No. 176, pp. 19-26 and cover pages.

*Primary Examiner*—Steven L. Stephan
*Assistant Examiner*—Clayton E. LaBalle
*Attorney, Agent, or Firm*—Frishauf, Holtz, Goodman & Woodward

[57] ABSTRACT

In a piezoelectric gyroscope system wherein a vibrating body is vibrated in a specific direction by a piezoelectric actuator and is subjected to another vibration in a direction perpendicular to the specific direction due to the Coriolis' force upon being subjected to a rotation of a rotational speed, the perpendicular vibration being detected as an electric signal representative of the rotational speed by a piezoelectric transducer, the vibrating body is made of a circular rod of a piezoelectric material having a plurality of elongated electrodes on the outer surface of the rod, in order to resolve difficulty for mounting piezoelectric transducers onto the vibrating body. A driving signal is applied to predetermined ones of the electrodes to vibrate the rod in a particular diametric direction and an output signal is detected from specific ones of the electrodes according to the vibration due to the Coriolis' force. When an even number of electrodes are provided, those electrodes are formed at equiangularly spaced positions on the outer surface of the rod. When an odd number of electrodes are provided, those electrodes are formed at equiangularly spaced positions within an angular region of (360 angular degrees × ⅔) on the outer surface of the rod.

24 Claims, 13 Drawing Sheets

GYROSCOPE USING CIRCULAR ROD TYPE PIEZOELECTRIC VIBRATOR

This application is a continuation of application Ser. No. 800,481, filed Nov. 29, 1991 now abandoned.

BACKGROUND OF THE INVENTION

The present invention relates to gyroscopes for use in attitude control systems, navigation systems, and others, and, in particular, to gyroscopes using piezoelectric vibrators or transducers.

The piezoelectric material is used in an electromechanical transducer. Such a transducer is called a piezoelectric transducer. The piezoelectric transducer can convert an electric energy into a mechanical energy or vibration and can convert the mechanical energy or vibration into an electrical energy or signal.

The piezoelectric transducer is used in a gyroscope.

The gyroscope using the piezoelectric transducer utilizes the Coriolis' force. In detail, the piezoelectric transducer drives a vibrating body. When the vibrating body is rotated at a rotational speed under the condition that the vibrating body vibrates in a direction, the Coriolis' force is generated in a direction perpendicular to the vibration. Thus, the vibrating body is further vibrated in the perpendicular direction due to the Coriolis' force. The vibration due to the Coriolis' force is converted by the piezoelectric transducer into an electric signal representative of the rotation speed.

In known piezoelectric gyroscopes, one or more piezoelectric transducers are fixedly mounted by use of adhesive onto a metallic vibrating body as described in detail hereinafter with reference to the drawing.

Accordingly, the known gyroscope is difficult to be produced with a constant accuracy because of use of the adhesive.

SUMMARY OF THE INVENTION

Therefore, it is an object of the present invention to provide a piezoelectric vibrator for use in gyroscope which is simple in structure with use of neither metallic vibrating body nor adhesive, each for production, and stable in properties.

It is another object of the present invention to provide a gyroscope system using the piezoelectric vibrator.

According to the present invention, a piezoelectric vibrator for use in a gyroscope is obtained which comprises a circular rod of a piezoelectric material, the circular rod having a circular cylindrical outer surface, a central axis along a longitudinal direction and a resonant frequency, and a plurality of elongated electrodes formed on the outer surface in parallel with each other along the central axis, the circular rod being polarized in a direction from each one of a particular one of the electrodes and other odd-numbered electrodes counted from the particular electrode to two even-numbered electrodes adjacent to the each one electrode.

A gyroscope system according to the present invention comprises a piezoelectric vibrator. The vibrator comprises a circular rod of a piezoelectric material, the circular rod having a circular cylindrical outer surface, a central axis along a longitudinal direction and a resonant frequency, and a plurality of elongated electrodes formed on the outer surface in parallel with each other along the central axis, the circular rod being polarized in a direction from each one of a particular one of the electrodes and other odd-numbered electrodes counted from the particular electrode to two even-numbered electrodes adjacent to the each one electrode. The gyroscope system further comprises driving means for supplying a driving signal with a frequency corresponding to the resonant frequency to predetermined ones of the electrodes to vibrate the circular rod in a particular diametric direction, specific ones of the electrodes producing output signals due to vibration caused by the Coriolis' force generated by rotation of the circular rod at a rotational speed, and means coupled with the specific electrodes responsive to the output signals for producing a detected signal representative of the rotational speed.

DESCRIPTION OF THE PREFERRED EMBODIMENTS

Prior to description of preferred embodiments of the present invention, several known gyroscopes will be described with reference to the drawings.

Figure 1:
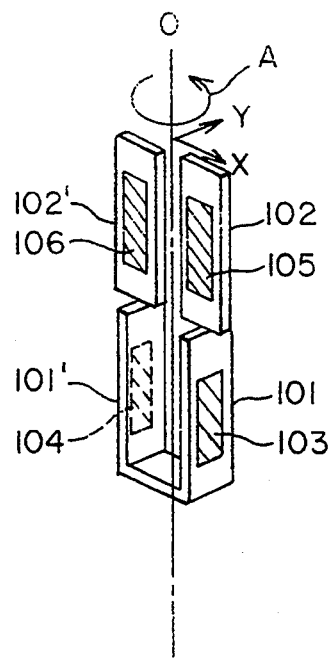
FIG. 1 is a perspective view of a known gyroscope using a tuning fork with piezoelectric transducers.

Referring to FIG. 1, a known gyroscope shown therein includes a tuning fork which comprises two vibrating reeds 101 and 101'. Additional vibrating reeds 102 and 102' are mounted onto top ends of vibrating reeds 101 and 101', respectively, so that the additional vibrating reeds 102 and 102' vibrate in a direction perpendicular to the vibration of the vibrating reeds 101 and 101'. The tuning fork including the additional vibrating reeds has a resonant frequency.

Four piezoelectric transducers 103 through 106 are mounted and fixed by adhesive onto surfaces of those vibrating reeds 101, 101', 102 and 102', respectively.

Each of piezoelectric transducers 103 through 106 comprises a thin piezoelectric plate polarized in a direction of the thickness and electrodes formed on both surfaces.

When piezoelectric transducers 103 and 104 are applied with, as a driving voltage, an alternating voltage having a frequency corresponding to the resonant frequency, the vibrating reeds 101 and 101' are driven to vibrate in thickness direction shown at arrow X, and additional vibrating reeds 102 and 102' are also vibrated in X direction.

Under the vibrating condition of those reeds, when the tuning fork is rotated at a rotational speed on its central axis 0 as shown at an arrow A, the Coriolis' force is generated in the direction Y perpendicular to the vibrating direction X. As a result, the additional vibrating reeds 102 and 102' are vibrated in the Y direction and the piezoelectric transducers 105 and 106 are vibrated in the thickness direction. Since the piezoelectric effect is reversible, the piezoelectric transducers 105 and 106 produce an output voltage in proportion to the rotational speed of the tuning fork.

Figure 2:
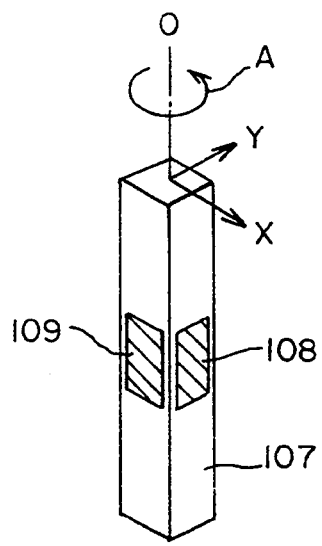
FIG. 2 is a perspective view of another known gyroscope using a metallic vibrating rectangular rod with piezoelectric transducers.

Referring to FIG. 2, another known gyroscope shown therein comprises a vibrator of a rectangular metallic rod 107 and two piezoelectric transducers 108 and 109 mounted and fixed by adhesive onto two adjacent surfaces of the rectangular metallic rod 107. The rectangular metallic rod 107 is able to vibrate in two directions X and Y perpendicular to each other and perpendicular to the adjacent surfaces of the rectangular metallic rod 107 with a resonant frequency. Each of the piezoelectric transducers 108 and 109 is made similar to the piezoelectric transducers 103 through 106 in FIG. 1.

When the piezoelectric transducer 108 is supplied with a driving voltage having a frequency corresponding to the resonant frequency, the metallic rod 107 is driven to vibrate in the X direction perpendicular to the surface on which the piezoelectric transducer 108 is mounted. Under the condition, when the metallic rod 107 is rotated at a rotating speed, the Coriolis' force is generated in the perpendicular direction Y and vibrates the metallic rod 107 in the Y direction. Accordingly, the other piezoelectric transducer 109 produces an output voltage in proportion to the rotating speed.

Figure 3:
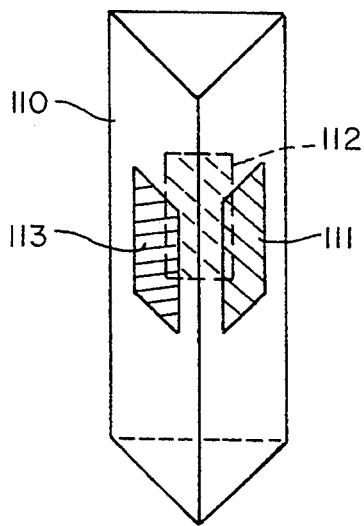
FIG. 3 is a perspective view of another known gyroscope using a metallic vibrating triangular rod with piezoelectric transducers.

Referring to FIG. 3, another known gyroscope comprises a vibrator of triangular metallic rod 110 and three piezoelectric transducers 111 through 113. The metallic rod 110 is able to vibrate at a resonant frequency in three directions perpendicular to the three surfaces of the triangular rod 110, respectively. Each of the three piezoelectric transducers 111 through 113 is made similar to each of the piezoelectric transducers 103 through 106 in FIG. 1.

Figure 4:
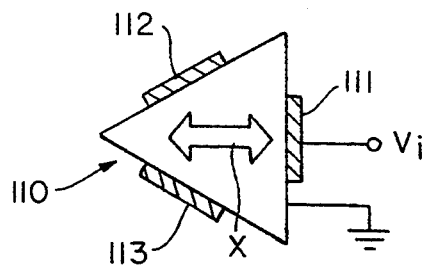
FIG. 4 is a plan view illustrating vibration of the triangular rod in the gyroscope of FIG. 3.

Referring to FIG. 4, when one piezoelectric transducer 111 is applied with a driving voltage $v_i$ having a frequency corresponding to the resonant frequency, the metallic rod 110 vibrates in the direction (which is shown at arrow X) perpendicular to the surface on which the piezoelectric transducer 111 is mounted.

The piezoelectric effect is reversible. Therefore, when the triangular rod 110 is vibrating at the resonant frequency in X direction by any other external force, the piezoelectric transducer 111 produces an output voltage corresponding to a level of the vibration.

Figure 5:
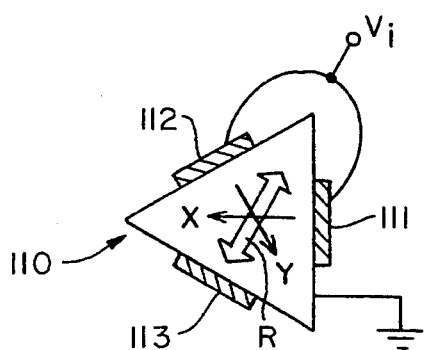
FIG. 5 is a plan view illustrating different vibration of the triangular rod in the gyroscope of FIG. 3.

Referring to FIG. 5, when the driving voltage $v_i$ is applied to the adjacent piezoelectric transducers 111 and 112 with the same phase, the triangular rod 110 is driven to vibrate in the X direction by the piezoelectric transducers 111 and also vibrate by the other piezoelectric transducers 112 in the direction Y perpendicular to the surface on which the piezoelectric transducers 112 is mounted. As a result, the triangular rod 110 vibrates in a resultant direction as shown by an arrow R which is perpendicular to the other surface on which the remaining piezoelectric transducer 113 is mounted.

In FIG. 5, when the triangular rod 110 is vibrating in the direction R at the resonant frequency, the piezoelectric transducer 111 and 112 produce an output voltage corresponding to a level of the vibration.

Figure 6:
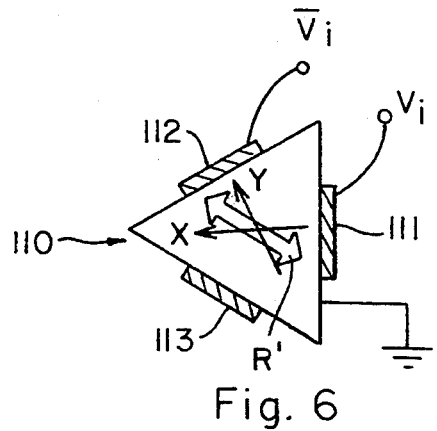
FIG. 6 is a plan view illustrating different vibration of the triangular rod in the gyroscope of FIG. 3.

Referring to FIG. 6, when the driving voltage is applied to the piezoelectric transducer 111 and the piezoelectric transducer 112 at reversed phases as shown by $v_i$ and $\overline{v_i}$, vibrations in X and Y directions are different in phase from those in FIG. 5. Providing that the phase of X direction vibration in FIG. 6 is equal to that in FIG. 5, the phase of Y direction vibration in FIG. 6 is reversed from that in FIG. 5. Accordingly, the direction of the resultant vibration is parallel with the other surface on which the remaining piezoelectric transducer 113 is mounted, as shown by an arrow R'.

In FIG. 6, when the triangular rod 110 is vibrating in the direction R' by any other external force at the resonant frequency, the piezoelectric transducers 111 and 112 produce output voltage of reversed phases to each other but having a voltage level corresponding to a level of the vibration.

Figure 7:
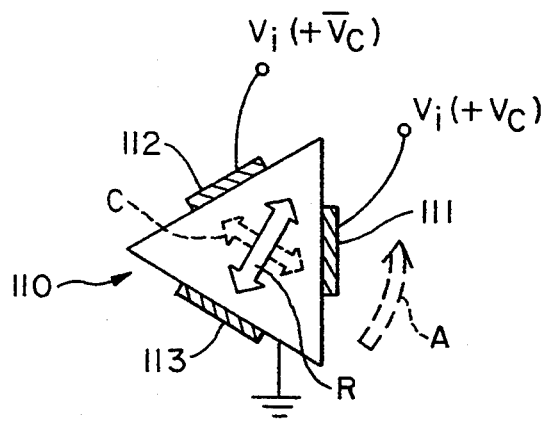
FIG. 7 is a plan view illustrating operation of the gyroscope of FIG. 3.

Referring to FIG. 7, when the triangular rod 110 is rotated in a direction A at a rotation speed on a central axis of the rod under application of the driving voltage $v_i$ to the piezoelectric transducers 111 and 112, the Coriolis' force C generates in a direction C perpendicular to the vibrating direction R. Accordingly, the triangular rod 110 vibrates in the C direction. As a result, the piezoelectric transducers 111 and 112 generates output voltages of reversed phases $v_c$ and $\bar{v}_c$. Therefore, a voltage difference $(v_i+\bar{v}_c)-(v_i+v_c)$ is present across terminals of both piezoelectric transducers 111 and 112. The voltage difference is proportional to the rotational speed of the triangular rod 110.

The above-mentioned known gyroscopes have problems as described in the preamble of the description.

Figure 8:
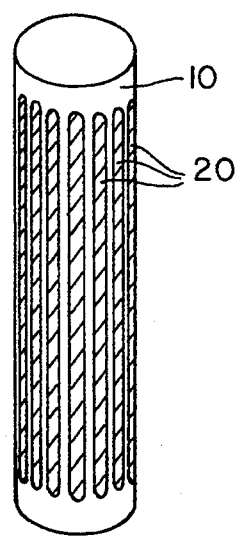
FIG. 8 is a perspective view of a piezoelectric vibrator according to one embodiment of the present invention.

Referring to FIG. 8, a piezoelectric vibration is shown for use in a piezoelectric gyroscope according to an embodiment of the present invention. The piezoelectric vibrator comprises a circular rod 10 of a piezoelectric material such as $BaTiO_3$ and $PbTi_xZr_{1-x}O_3$.

The rod 10 is a rigid lengthy body but may be a hollow lengthy body like a tube or a pipe. The rod 10 has a circular cylindrical outer surface and a central axis in a longitudinal direction and is able to make a bending vibration in any radial direction at a resonant frequency fr which is determined by the following equation:

$$fr = \frac{a_m^2 \cdot D}{8\pi \cdot L^2} \sqrt{\frac{E}{\rho}},$$

D: diameter of the rod
L: length of the rod
E: Young's modulus
$\rho$: density
$a_m$: constant determined by vibration order A plurality of (2n, n being an integer larger than 2) elongated electrodes 20 are formed on the outer surface of the rod 10 and equiangularly spaced from each other to extend in parallel with each other along the central axis of the rod 10.

The electrodes 20 can be formed on the rod 10 by the screen printing method which is per se well known in the art. Alternatively, the outer surface of the rod 10 is entirely covered with a layer of an electrode forming material by, for example, plating, and the layer is partially removed by, for example, the photoetching technique which is also well known in the art. Thus, the elongated electrodes 20 are formed.

The number of the electrodes 20 is not limited but is preferably six or eight in view of easiness and accuracy of the electrode forming operation. Description will be made as to an example having six electrodes below.

Figure 9:
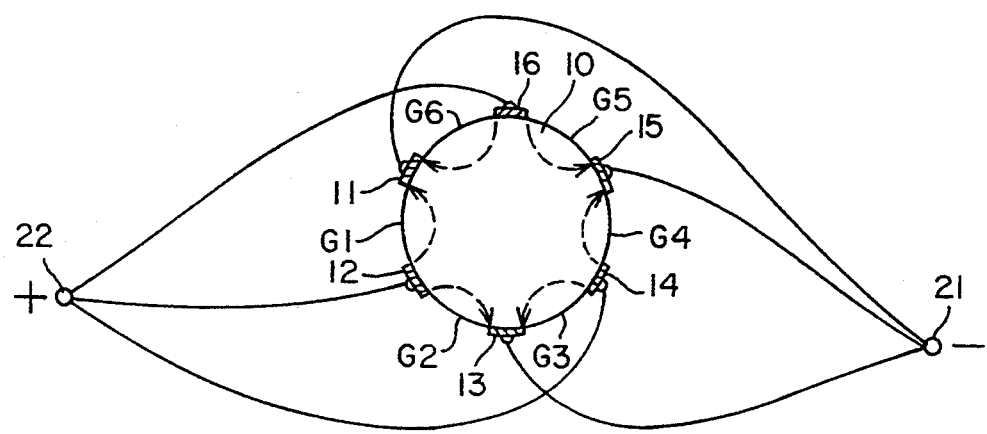
FIG. 9 is a plan view illustrating polarization of an example of the vibrator of FIG. 8.

Referring to FIG. 9, six electrodes 11 through 16 are formed at equiangularly spaced positions on the outer surface of the rod 10. Those electrodes 11–16 are classified into a first and a second groups. The first group is a set of three electrodes 11, 13 and 15 which are odd-numbered electrodes when counted from the electrode 11, and the second group is another set of the remaining electrodes 12, 14 and 16 which are even-numbered ones. The electrodes 11, 13 and 15 in the first group are electrically connected to a common terminal 21 by electric cables. The electrodes 12, 14 and 16 in the second group are electrically connected to a common terminal 22 by electric cables. DC voltage are applied across the terminals 21 and 22 so as to polarize the piezoelectric rod 10. Providing that the negative and the positive of the DC voltage are applied to the first and the second terminals 21 and 22, respectively, the piezoelectric rod 10 is polarized in the directions as illustrated by dotted arrows in the figure. That is, the rod 10 is polarized at spaces G1-G6 between adjacent ones of the electrodes 11-16. The polarization at each space is directed from one of the electrodes 12, 14 and 16 of the second group to one of the electrodes 11, 13 and 15 of the first group which determine the space.

Now, operation will be described of the piezoelectric vibrator polarized as shown in FIG. 9.

Figure 10:
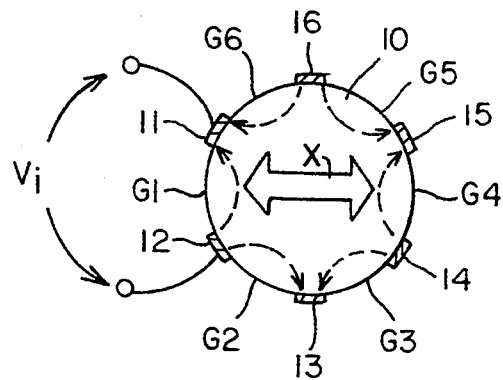
FIG. 10 is a plan view illustrating vibration of the vibrator of FIG. 9, under application of a driving voltage across a pair of adjacent electrodes.

Referring to FIG. 10, when an alternative voltage of a frequency corresponding to the resonant frequency is applied across the adjacent electrodes 11 and 12 as a driving voltage $v_i$, the piezoelectric rod 10 expands and contracts at the space portion G1 between the adjacent electrodes 11 and 12. In detail, when an electric field is generated by the driving voltage in the direction polarized at the space portion G1, the space portion G1 is expanded. On the other hand, when an electric field is generated by the driving voltage in the reversed direction of the polarization at the space portion G1, the space portion G1 is contracted. As a result, the piezoelectric rod 10 makes the bending vibration in a diametric direction as shown by an arrow X along a plane which connects a middle of the space portion G1 and the center axis of the rod 10.

Since the piezoelectric effect is reversible, when the piezoelectric rod 10 is vibrating in the direction X by any other external force, an output voltage is produced across the adjacent electrodes 11 and 12 in proportion to a level of the vibration. Another pair of adjacent electrodes 15 and 14 is symmetrically located to the pair of the electrodes 11 and 12 with reference to a diameter perpendicular to the vibrating direction X. Accordingly, when the rod 10 is vibrated in the X direction due to application of the driving voltage $v_i$ across the electrodes 11 and 12, an output voltage is generated across the electrodes 15 and 16 in the similar reason. The output voltage is proportional to a level of the vibration and is determined as $v_i$ if neglecting the converting loss.

Figure 11:
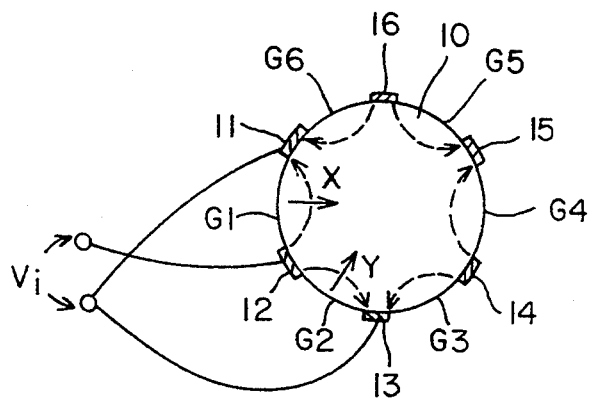
FIG. 11 is a plan view illustrating vibration of the vibrator of FIG. 9, under application of a driving voltage across different pairs of adjacent electrodes.

Referring to FIG. 11, when the driving voltage $v_i$ is further applied across another adjacent electrodes 13 and 12 in addition to the adjacent electrodes 11 and 12 in FIG. 10, the piezoelectric rod 10 further makes the bending vibration in another diametric direction as shown by an arrow Y along a plane which connects a middle of the space portion G2 and the center axis of the rod 10. As a result, the X direction vibration and the Y direction vibration are composed to each other and the piezoelectric rod 10 vibrates at a resultant direction as shown by an arrow R in FIG. 12. The resultant direction R is a diametric direction along a plane which connects a center of the central electrode 12 and the center axis of the rod 10.

Figure 12:
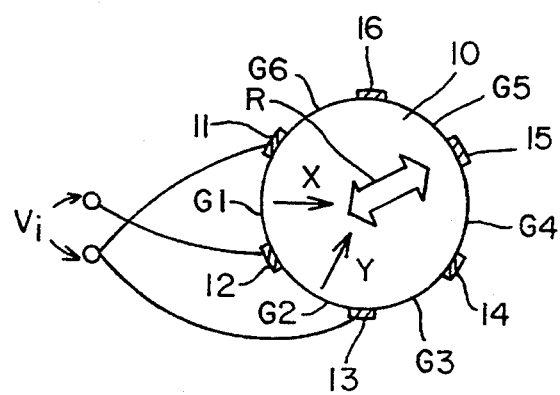
FIG. 12 is a plan view illustrating resultant vibration of the vibrator in FIG. 11.

In FIG. 12, electrodes 16, 15 and 14 are symmetrically located to the electrodes 11, 12 and 13 with reference to a diameter perpendicular to the vibrating direction R. Accordingly, when the rod 10 is vibrated in the R direction due to application of the driving voltage $v_i$ across the electrodes 11 and 12 and across the electrodes 13 and 12, an output voltage is generated across the electrodes 15 and 16 and across the electrodes 14 and 15 in the similar reason in FIG. 10. The output voltage is proportional to a level of the vibration and is determined as $v_i$ if neglecting the converting loss.

Figure 13:
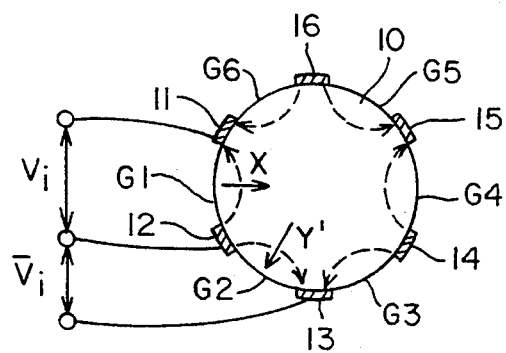
FIG. 13 is a plan view illustrating vibration of the vibrator of FIG. 9, under application of a driving voltage across different pairs of adjacent electrodes with opposite phases.

Referring to FIG. 13, the driving voltage $v_i$ is applied across the adjacent electrodes 11 and 12 as in FIG. 11 and the driving voltage $v_i$ is also applied across the adjacent electrodes 13 and 12 but as a driving voltage $\bar{v}_i$ in the reversed phase in comparison with FIG. 11. Therefore, the vibration in the X direction is generated similar to that in FIG. 11 but the vibration in the Y direction is generated as a vibration Y' of a reversed phase in comparison with FIG. 11. Accordingly, the vibrations in the X and the Y' directions are composed and the piezoelectric rod 10 is vibrated in a resultant direction R' as shown in FIG. 14. it will be understood that the direction R' is perpendicular to the direction R in FIG. 12.

Figure 14:
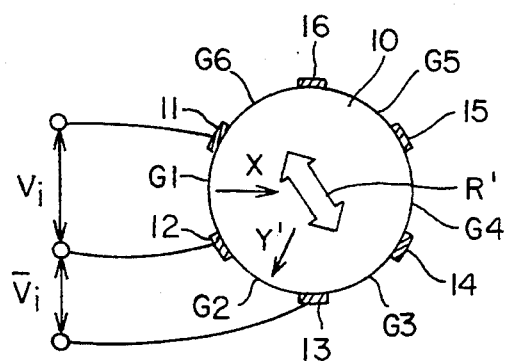
FIG. 14 is a plan view illustrating resultant vibration of the vibrator in FIG. 13.

In FIG. 14, the other electrodes 16, 15 and 14 are also symmetrically located to the electrodes 11, 12 and 13 with reference to a diameter in the vibrating direction R'. Accordingly, when the rod 10 is vibrated in the R' direction due to application of the driving voltages $v_i$ and $\bar{v}_i$ across the electrodes 11 and 12 and the electrodes 13 and 12, respectively, output voltages of reversed phases are generated across the electrodes 15 and 16 and across the electrodes 14 and 15, respectively, in the similar reason in FIG. 12. The output voltages are proportional to the vibration in the R' direction and are determined as $v_i$ and $\bar{v}_i$ if neglecting the converting loss.

Figure 15:
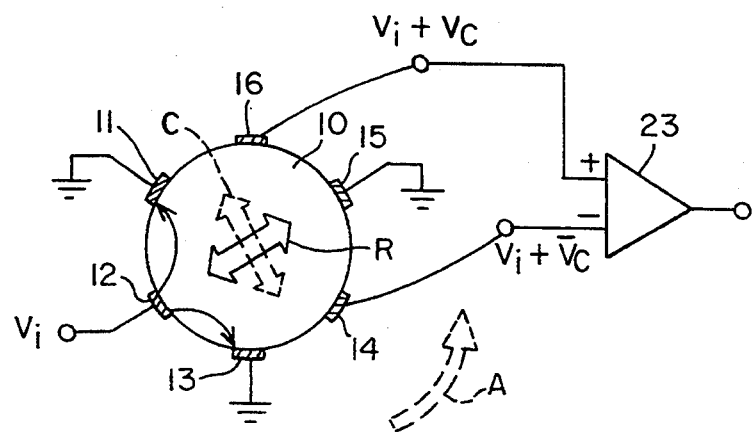
FIG. 15 is a block diagram of a gyroscope using the piezoelectric vibrator of FIG. 9.

Now, referring to FIG. 15, description will be made as regards a piezoelectric gyroscope system according to an embodiment of the present invention. The gyroscope system uses the piezoelectric vibrator as described above in connection with FIGS. 8 to 14.

The electrodes 11 and 13 are grounded and the driving voltage $v_i$ is applied to the electrode 12. Accordingly, the piezoelectric rod 10 vibrates in the direction R as described above in connection with FIGS. 11 and 12.

Under the condition, when the vibrator is rotated at a rotating speed in a direction of an arrow A on the center axis of the rod 10, the Coriolis' force C generates in the direction perpendicular to the vibrating direction R and vibrates the piezoelectric rod 10 in the direction of C.

The electrodes 16 and 14 are connected to a comparator 23 or a differential amplifier and the electrode 15 is grounded.

Neglecting the converting loss, an output voltage $v_i$ is generated at the electrodes 16 and 14 due to the vibration in the R direction as described in connection with FIG. 12, and output voltages $v_c$ and $\bar{v}_c$ of reversed phases are produced at the electrodes 16 and 14 due to the vibration in the C direction as described in connection with FIG. 14. As a result, the voltages $(v_i+v_c)$ and $(v_i+\bar{v}_c)$ are present at the electrodes 16 and 14. The comparator 23 produces a voltage difference between the output voltages $(v_i+v_c)$ and $(v_i+\bar{v}_c)$ as a detection output $(2v_c)$ which is proportional to the rotating speed.

When the piezoelectric rod and the electrodes are made with a dimensional error, the vibrator is not symmetric and the comparator 23 produces an error voltage even when the transducer is not rotated. The error voltage varies in dependence on the dimensional error.

In order to resolve the variation of the error voltage from the comparator due to the dimensional error, driving voltages applied to the electrodes 11, 12 and 13 are made adjustable.

Figure 16:
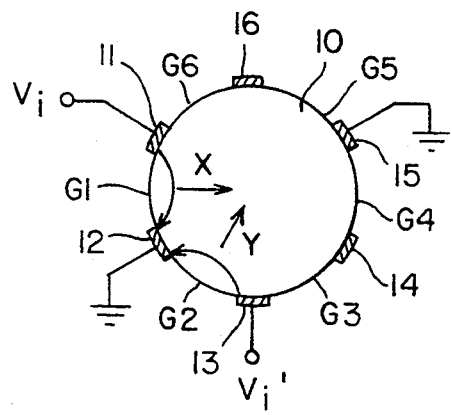
FIG. 16 is a view illustrating a variation of FIG. 11.
Figure 17:
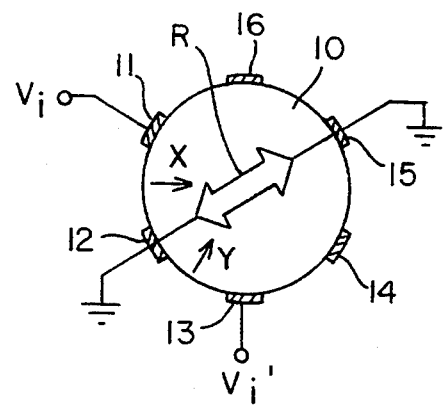
FIG. 17 is a view illustrating resultant vibration of the vibrator in FIG. 16.

Referring to FIG. 16, the central electrode 12 is grounded and the electrodes 11 and 13 are supplied with driving voltages $v_i$ and $v_i'$ which are adjustable. The piezoelectric rod 10 vibrates in the X direction due to the application of $v_i$ across the electrodes 11 and 12 and also in the Y direction due to the application of $v_i'$ across the electrodes 13 and 12. The vibration level in each of the X and Y direction can be controlled by adjusting each of voltage levels of $v_i$ and $v_i'$. Accordingly, by controlling $v_i$ and $v_i'$, the resultant vibrating direction R of X and Y directions can be adjusted to coincide with a diametric direction along a plane which connects a center line of the central electrode 12 and the center axis of the rod 10 as shown in FIG. 17.

Figure 18:
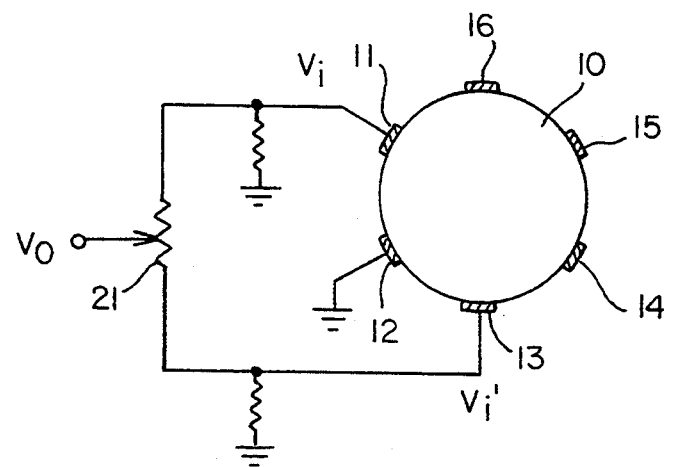
FIGS. 18 and 19 show different circuits for controlling driving voltage applied to the electrodes.

Referring to FIG. 18, a source voltage $v_o$ is divided by a variable resistor 21 into $v_i$ and $v_i'$ which are applied to the electrodes 11 and 13, respectively. The voltages $v_i$ and $v_i'$ can be controlled by adjusting the variable resistor 21.

Figure 19:
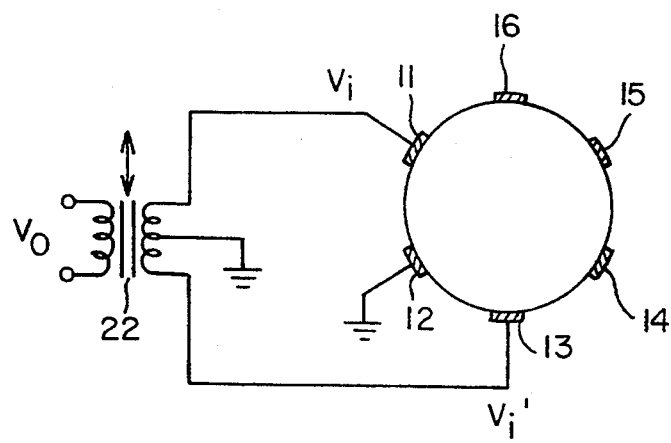

Referring to FIG. 19, the source voltage $v_o$ is transformed into $v_i$ and $v_i'$ through a voltage transformer 22 which are applied to the electrodes 11 and 13. The transformer 22 has an adjusting core which is movable as shown by an arrow so as to vary a coupling factor between a primary and a secondary winding of the transformer. The voltages $v_i$ and $v_i'$ can be adjusted by operation of the adjusting core.

Figure 20:
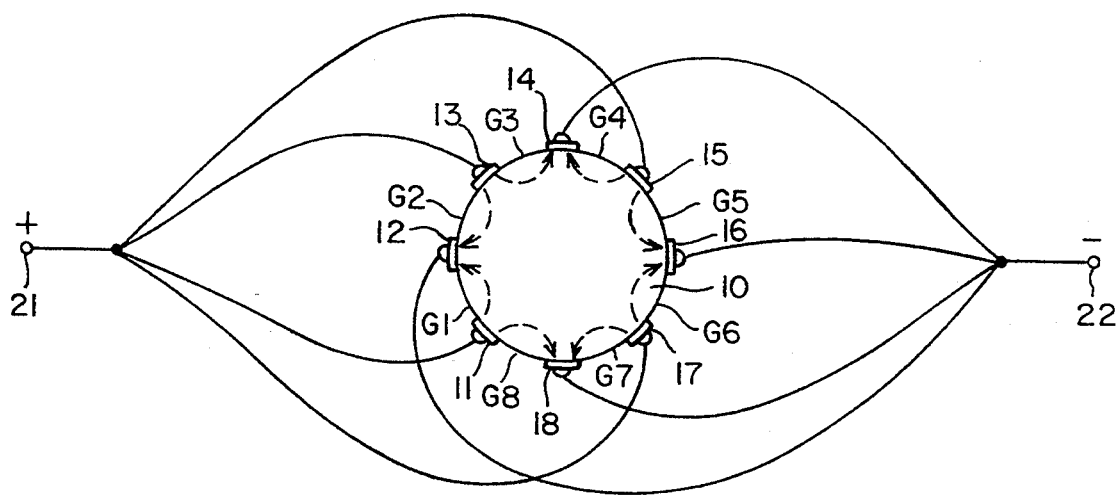
FIG. 20 is a plan view illustrating polarization of another example of the vibrator of FIG. 8.

Referring to FIG. 20, eight electrodes 11 through 18 are formed at equiangularly spaced positions on the outer surface of the rod 10. Those electrodes 11–18 are classified into a first and a second groups. The first group is a set of four electrodes 11, 13, 15 and 17 which are odd-numbered electrodes when counted from the electrode 11, and the second group is another set of the remaining electrodes 12, 14, 16 and 18 which are even-numbered ones. The electrodes 11, 13, 15 and 17 in the first group are electrically connected to a common terminal 21 by electric cables. The electrodes 12, 14, 16 and 18 in the second group are electrically connected to a common terminal 22 by electric cables. DC voltage are applied across the terminals 21 and 22 so as to polarize the piezoelectric rod 10. Providing that the positive and the negative of the DC voltage are applied to the first and the second terminals 21 and 22, respectively, the piezoelectric rod 10 is polarized in the directions as illustrated by dotted arrows in the figure. That is, the rod 10 is polarized at spaces G1–G8 between adjacent ones of the electrodes 11–18. The polarization at each space is directed to one of the electrodes 12, 14, 16 and 18 of the second group from one of the electrodes 11, 13, 15 and 17 of the first group which determine the space.

Now, operation will be described of the piezoelectric vibrator polarized as shown in FIG. 20.

Figure 21:
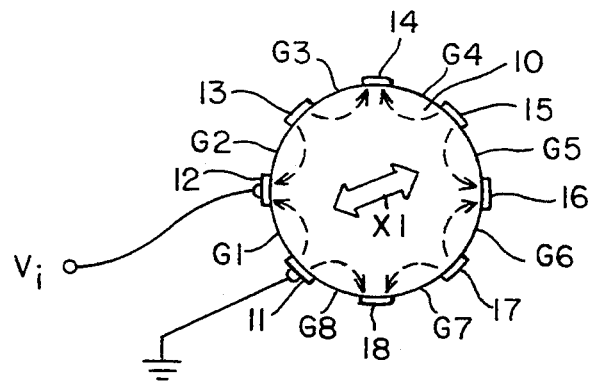
FIG. 21 is a plan view illustrating vibration of the vibrator of FIG. 20, under application of a driving voltage across a pair of adjacent electrodes.

Referring to FIG. 21, when an alternative voltage of a frequency corresponding to the resonant frequency is applied across the adjacent electrodes 11 and 12 as a driving voltage $v_i$, the piezoelectric rod 10 expands and contracts at the space portion G1 between the adjacent electrodes 11 and 12, as in FIG. 10. As a result, the piezoelectric rod 10 makes the bending vibration in a diametric direction as shown by an arrow X1 along a plane which connects a middle of the space portion G1 and the center axis of the rod 10.

Since the piezoelectric effect is reversible, when the piezoelectric rod 10 is vibrating in the direction X1 by any other external force, an output voltage is produced across the adjacent electrodes 11 and 12 in proportion to a level of the vibration. The output voltage is proportional to a level of the vibration and is determined as $v_i$ if neglecting the converting loss.

Figure 22:
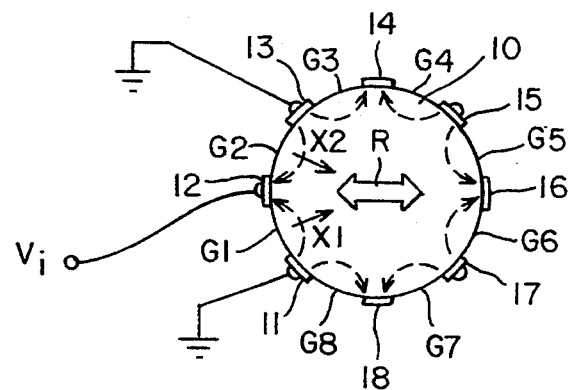
FIG. 22 is a plan view illustrating vibration of the vibrator of FIG. 20, under application of a driving voltage across different pairs of adjacent electrodes.

Referring to FIG. 22, when the driving voltage $v_i$ is further applied across another adjacent electrodes 13 and 12 in addition to the adjacent electrodes 11 and 12 in FIG. 21, the piezoelectric rod 10 further makes the bending vibration in another diametric direction as shown by an arrow X2 along a plane which connects a middle of the space portion G2 and the center axis of the rod 10. As a result, the X1 direction vibration and the X2 direction vibration are composed to each other and the piezoelectric rod 10 vibrates at a resultant direction as shown by an arrow R in the figure. The resultant direction R is a diametric direction along a plane which connects a center of the central electrode 12 and the center axis of the rod 12.

In FIG. 22, when the rod 10 is vibrated in the R direction due to any other external force, an output voltage is generated across the electrodes 12 and 13 and across the electrodes 12 and 11. The output voltage is proportional to a level of the vibration in the R direction.

Figure 23:
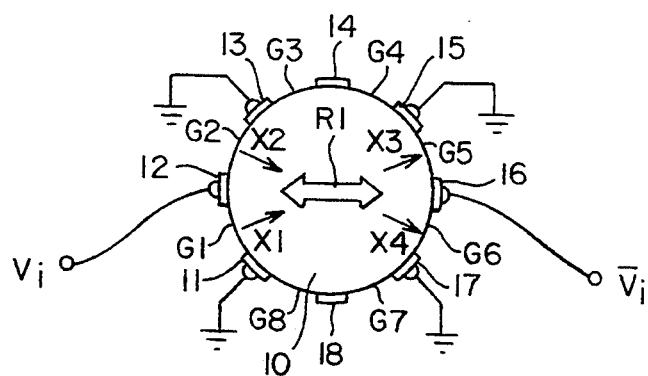
FIG. 23 is a plan view illustrating vibration of the vibrator of FIG. 20, under application of a driving voltage with reversed phases across different pairs of adjacent electrodes.

Referring to FIG. 23, the driving voltage $v_i$ is applied across electrodes 11-13 as in FIG. 22. Therefore, the rod 10 is vibrated in X1 and X2 directions as in FIG. 22. Further, the driving voltage $v_i$ is also applied across the electrodes 15-17 with a reversed phase in comparison with that to electrodes 11-13. Therefore, the driving voltage to the electrodes 15-17 is represented by $\overline{v_i}$. The electrodes 15-17 are positioned symmetric with the electrodes 11-13 with reference to the center of the rod 10. Accordingly, the rod 10 is further vibrated in the directions shown by arrows X3 and X4. As a result, the rod 10 is vibrated in a resultant direction R1 which is similar to the direction R.

In FIG. 23, when the rod 10 is vibrating in the direction R1 by any other external force without application of $v_i$ and $\overline{v_i}$, it will be understood that output voltages of reversed phases are generated at electrodes 12 and 16 with reference to grounded electrodes 11, 13, 15 and 17.

Figure 24:
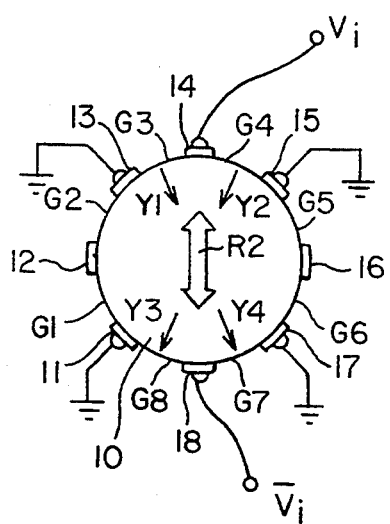
FIG. 24 is a plan view illustrating a variation of FIG. 23 in application of the driving voltage.

Referring to FIG. 24, the driving voltages of reversed phases $v_i$ and $\overline{v_i}$ are applied to the electrodes 13-15 and 17-19 which are positioned different by 90 angular degrees from electrodes to which $v_i$ and $\overline{v_i}$ are applied in FIG. 23. Accordingly, the rod 10 vibrates in the similar pattern to FIG. 23 but vibrating directions Y1, Y2, Y3, and Y4 are shifted by 90 angular degrees from X1, X2, X3 and X4 in FIG. 23. Therefore, a resultant vibrating direction R2 is also different by 90 angular degrees from R1 in FIG. 23.

In FIG. 24, the reversed-phase output voltages are also generated at electrodes 14 and 18 when the rod 10 is vibrating in the R2 direction by any other external force.

Figure 25:
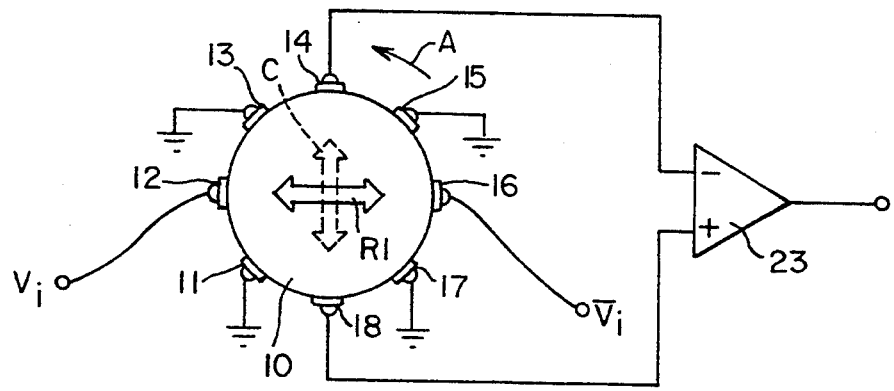
FIG. 25 is a block diagram of a gyroscope using the piezoelectric vibrator of FIG. 20.

Now, referring to FIG. 25, a piezoelectric gyroscope system according to another embodiment of the present invention uses the piezoelectric vibrator as described above in connection with FIGS. 20 to 24.

The driving voltages $v_i$ and $\overline{v_i}$ are applied to the vibrator in the similar manner as shown in FIG. 23. Accordingly, the piezoelectric rod 10 vibrates in the direction R1 as described above in connection with FIG. 23.

Under the condition, when the vibrator is rotated as a rotating speed in a direction of an arrow A on the center axis of the rod 10, the Coriolis' force C generates in the direction perpendicular to the vibrating direction R1 and vibrates the piezoelectric rod 10 in the direction of C. The vibrating direction C is similar to the direction R2 in FIG. 24. Therefore, output voltages $v_c$ and $\overline{v_c}$ of reversed phases are produced at the electrodes 14 and 18 due to the vibration in the C direction as described in connection with FIG. 24.

The electrodes 14 and 18 are connected to a comparator 23 or a differential amplifier. The comparator 23 produces a voltage differences between the output voltages $v_c$ and $\overline{v_c}$ as a detection output ($2v_c$) which is proportional to the rotating speed.

In the embodiment shown in FIGS. 8-25, the piezoelectric vibrator has an even number of electrodes.

It is possible to make a similar piezoelectric vibrator having an odd number of electrodes which can be used in the gyroscope.

When an odd number of electrodes are formed on a circular rod of a piezoelectric material to form the vibrator, the electrodes must be located within an angular region of (360 angular degrees $\times \frac{2}{3}$) on an outer surface of the rod.

The number of the electrodes is not limited but is preferably five or seven in view of easiness and accuracy of the electrode forming operation. Description will be made as to an example having five electrodes below.

Figure 26:
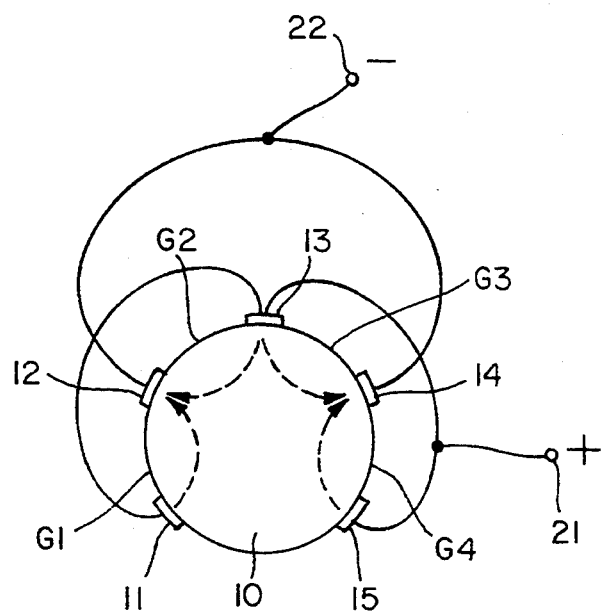
FIG. 26 is a plan view of a piezoelectric vibrator according to another embodiment of the present invention, with illustration of polarization.

Referring to FIG. 26, five electrodes 11 through 15 are formed at equiangularly spaced positions within an angular region of (360 angular degrees $\times \frac{2}{3}$) on the outer surface of the rod 10. Those electrodes 11-15 are classified into a first and a second groups. The first group is a set of three electrodes 11, 13 and 15 which are odd-numbered electrodes when counted from the electrode 11, and the second group is another set of the remaining electrodes 12 and 14 which are even-numbered ones. The electrodes 11, 13 and 15 in the first group are electrically connected to a common terminal 21 by electric cables. The electrodes 12 and 14 in the second group are electrically connected to a common terminal 22 by electric cables. DC voltage are applied across the terminals 21 and 22 so as to polarize the piezoelectric rod 10. Providing that the positive and the negative of the DC voltage are applied to the first and the second terminals 21 and 22, respectively, the piezoelectric rod 10 is polarized in the directions as illustrated by dotted arrows in the figure. That is, the rod 10 is polarized at spaces G1-G5 between adjacent ones of the electrodes 11-15. The polarization at each space is directed from one of the electrodes 11, 13 and 15 of the first group to one of the electrodes 12 and 14 of the second group which determine the space.

Now, operation will be described of the piezoelectric vibrator polarized as shown in FIG. 26.

Figure 27:
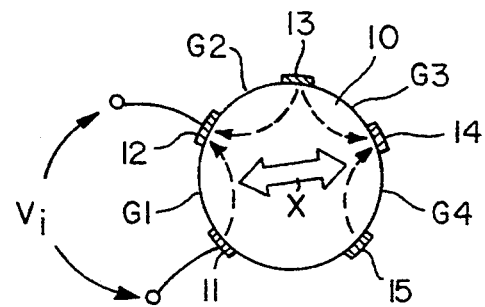
FIG. 27 is a plan view illustrating vibration of the vibrator of FIG. 26 under application of driving voltage across a pair of adjacent electrodes.

Referring to FIG. 27, when an alternative voltage of a frequency corresponding to the resonant frequency is applied across the adjacent electrodes 11 and 12 as a driving voltage $v_i$, the piezoelectric rod 10 expands and contracts at the space portion G1 between the adjacent electrodes 11 and 12 in the similar manner as in FIG. 10. As a result, the piezoelectric rod 10 makes the bending vibration in a diametric direction as shown by an arrow X along a plane which connects a middle of the space portion G1 and the center axis of the rod 10.

Since the piezoelectric effect is reversible, the piezoelectric rod 10 is vibrating in the direction x by any other external force, an output voltage is produced across the adjacent electrodes 11 and 12 in proportion to a level of the vibration. The output voltage is proportional to a level of the vibration and is determined as $v_i$ if neglecting the converting loss.

Figure 28:
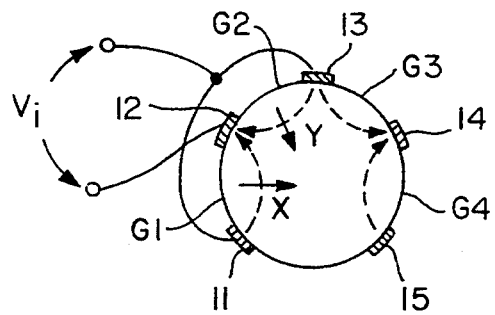
FIG. 28 is a plan view illustrating vibration of the vibrator of FIG. 26, under application of a driving voltage across different pairs of adjacent electrodes.

Referring to FIG. 28, when the driving voltage $v_i$ is further applied across another adjacent electrodes 13 and 12 in addition to the adjacent electrodes 11 and 12 in FIG. 27, the piezoelectric rod 10 further makes the bending vibration in another diametric direction as shown by an arrow Y along a plane which connects a middle of the space portion G2 and the center axis of the rod 10. As a result, the X direction vibration and the Y direction vibration are composed to each other and the piezoelectric rod 10 vibrates at a resultant direction as shown by an arrow R in FIG. 29. The resultant direction R is a diametric direction along a plane which connects a center of the central electrode 12 and the center axis of the rod 12.

Figure 29:
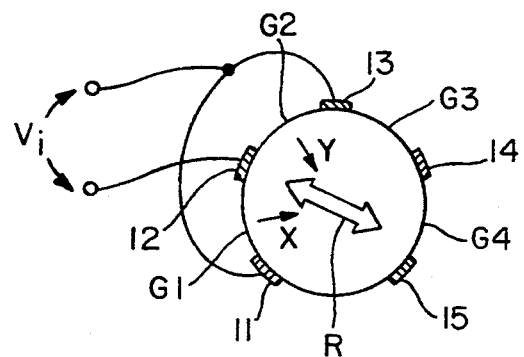
FIG. 29 is a plan view illustrating resultant vibration of the vibrator in FIG. 28.

In FIG. 29, when the rod 10 is vibrated in the R direction by any other external force, an output voltage is generated across the electrode 12 ane each of the electrodes 11 and 13. The output voltage is proportional to a level of the vibration and is determined as $v_i$ if neglecting the converting loss.

Figure 30:
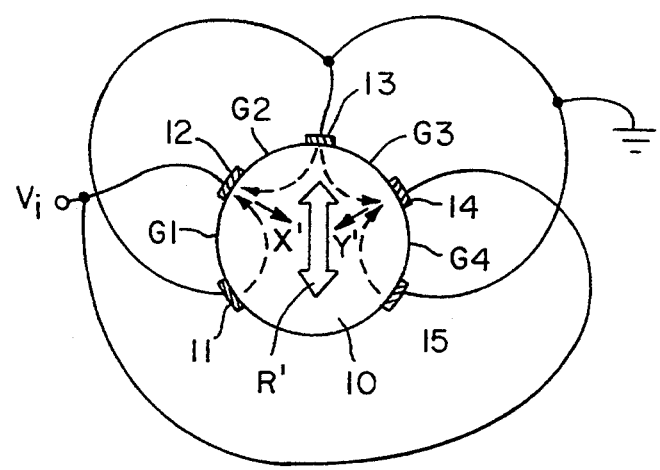
FIG. 30 is a plan view illustrating vibration of the vibrator of FIG. 26, under application of a driving voltage across different pairs of adjacent electrodes with opposite phases.

Referring to FIG. 30, electrodes 11, 13 and 15 of the first group are grounded and the other electrodes 12 and 14 of the second group are supplied with the driving voltage $v_i$ in the same phase. Accordingly, the piezoelectric rod 10 vibrates in the direction shown at X' due to the application of the driving voltage $v_i$ across the electrode 12 and each of electrodes 11 and 13 as described above in connection with FIGS. 28 and 29. In the similar manner, the piezoelectric rod 10 vibrates in a direction (shown by Y') symmetric with the direction X' due to the application of the driving voltage $v_i$ across the electrode 14 and each of electrodes 13 and 15. The X' direction vibration and the Y' direction vibration are composed, so that the piezoelectric rod 10 vibrates in a resultant direction as shown by an arrow R' in the figure. The direction R' is a diametric direction along a plane which connects a center line of the central electrode 13 and the center axis of the rod 10.

In this connection, if the angular region where the electrodes 11–15 are formed is larger than (360 angular degrees × ⅔), an angle between the X' direction and the symmetric direction Y' exceeds 120 angular degrees, so that the composed vibration is disadvantageously made smaller than each of vibrations in X' and Y' directions. Accordingly, the odd number of electrodes 11–15 should be formed within the angular range of (360 angular degrees × ⅔).

In FIG. 30, when the rod 10 is vibrated in the R' direction by any other external force, an output voltage is generated at each of electrodes 12 and 14. The output voltage is proportional to a level of the vibration and is determined as $v_i$ if neglecting the converting loss.

Figure 31:
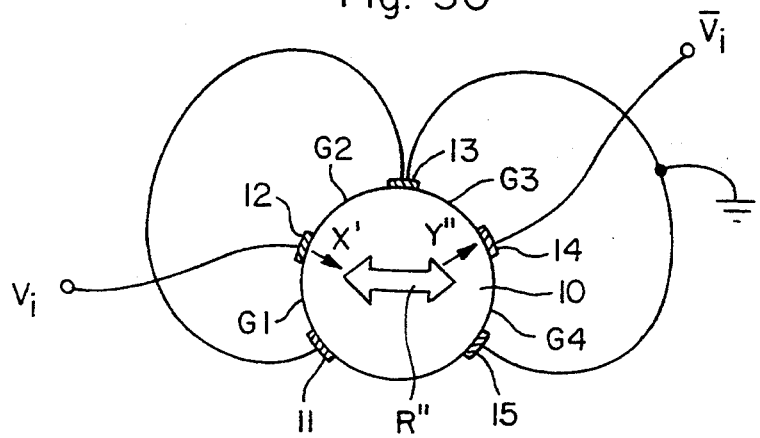
FIG. 31 is a plan view illustrating resultant vibration of the vibrator in FIG. 30.

Referring to FIG. 31, when the driving voltage $v_i$ is applied to the electrodes 12 and 14 in the reversed phase as $v_i$ and $\bar{v}_i$, the piezoelectric rod 10 vibrates in the X' direction and Y' direction similar to FIG. 30. However, the phase of the vibration in the X' and Y' directions is reversed. Accordingly, the Y' direction is shown by an arrow Y''' in the figure which is reversed in comparison with the arrow Y' in FIG. 30. Therefore, the X direction vibration and the Y''' direction vibration are composed, so that the piezoelectric rod 10 vibration in a resultant direction as shown by an arrow R'' in the figure. The direction R'' is perpendicular to the direction R' in FIG. 30.

In FIG. 31, when the rod 10 is vibrated in the R'' direction by any other external force, an output voltage is generated at electrodes 12 and 14 with a reversed phase. The output voltage is proportional to a level of the vibration and is determined as $v_i$ and $\bar{v}_i$ if neglecting the converting loss.

Figure 32:
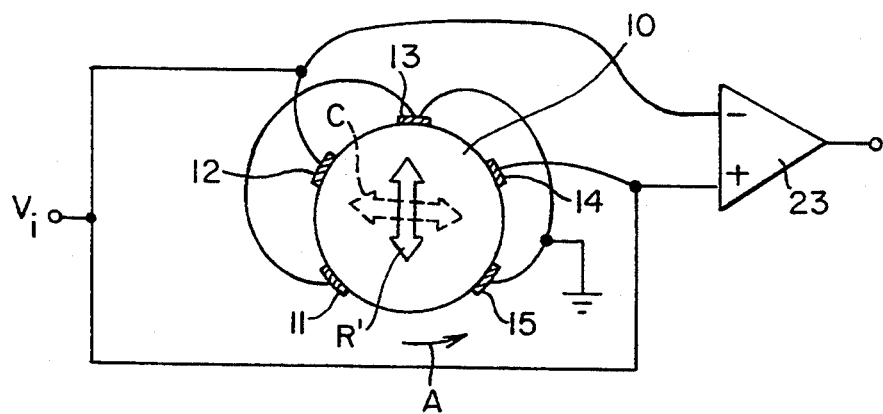
FIG. 32 is a block diagram of a gyroscope using the piezoelectric vibrator of FIG. 26.

Now, referring to FIG. 32, a piezoelectric gyroscope system according to another embodiment of the present invention uses the piezoelectric vibrator as described above in connection with FIGS. 26 to 31.

The electrodes 11, 13 and 15 are grounded and the driving voltage $v_i$ is applied to the electrodes 12 and 14 in the same phase. Therefore, the piezoelectric rod is vibrated in the direction R' similar to FIG. 30.

Under the condition, when the piezoelectric rod 10 is rotated at a rotating speed in a direction shown by arrow A on the center axis of the rod 10, the Coriolis' force C is generated and vibrates the rod 10 in the direction of C. The C direction is perpendicular to the direction R' and is therefore similar to the direction R'' in FIG. 31.

According to the operation described in connection with FIG. 31, output voltages of reversed phases are produced at the electrodes 12 and 14 due to the vibration generated by the Coriolis' force.

The electrodes 12 and 14 are connected to a comparator 23. The comparator 23 compares the voltages on the electrodes 12 and 14 to produce an error signal. The error signal is a detection voltage representative of the rotational speed of the rod 10.

What is claimed is:

1. A piezoelectric vibrator for use in a gyroscope, comprising:

a circular rod formed of a piezoelectric material, said circular rod having a circular cylindrical outer surface and a central axis extending along a longitudinal direction of said circular rod;

said circular rod being simultaneously bendable and vibratable in any preselected radial direction at a resonant frequency thereof;

a plurality of elongated electrodes formed on said outer surface of said circular rod, said plurality of elongated electrodes being formed in parallel with each other and extending in the direction of said central axis of said circular rod;

said circular rod being polarized by said plurality of elongated electrodes in a direction away from a particular odd-numbered one of said plurality of elongated electrodes and in a direction away from at least one other odd-numbered one of said plurality of elongated electrodes, when counted in a direction away from said particular odd-numbered one of said plurality of elongated electrodes, and in a direction toward at least a given even-numbered one of said plurality of elongated electrodes, when counted in said direction away from said particular odd-numbered one of said plurality of elongated electrodes, said at least a given even-numbered one of said plurality of elongated electrodes being positioned adjacent to at least one odd-numbered one of said plurality of elongated electrodes, including said particular odd-numbered one of said plurality of elongated electrodes;

at least two of said plurality of elongated electrodes also being input electrodes for receiving a driving signal, said driving signal having a frequency corresponding to said resonant frequency, for vibrating said circular rod in a predetermined diametric direction and for simultaneously bending and vibrating said circular rod in said preselected radial direction; and at least two of said plurality of elongated electrodes also being output electrodes for providing output signals, said output electrodes being those ones of said plurality of elongated electrodes that are positioned symmetrically with respect to said predetermined diametric direction, said output signals being formed by vibrations caused by a Coriolis' force generated by a rotation of said circular rod at a rotational speed.

2. A piezoelectric vibrator as claimed in claim 1, wherein said plurality of elongated electrodes comprises an even number of elongated electrodes, said even number of elongated electrodes being located at equiangularly spaced positions on said circular cylindrical outer surface of said circular rod.

3. A piezoelectric vibrator as claimed in claim 2, wherein six elongated electrodes are formed on said circular cylindrical outer surface of said circular rod.

4. A piezoelectric vibrator as claimed in claim 3, wherein:
said plurality of input electrodes includes three adjacent input electrodes;
said predetermined diametric direction is along a plane which connects a center of a central one of said three adjacent input electrodes and said central axis of said circular rod; and
said output electrodes comprise three output electrodes that are positioned to be symmetric with said three input electrodes when viewed with respect to a plane that is perpendicular to said predetermined diametric direction.

5. A piezoelectric vibrator as claimed in claim 2, wherein eight elongated electrodes are formed on said circular cylindrical outer surface of said circular rod.

6. A piezoelectric vibrator as claimed in claim 5, wherein:
said plurality of input electrodes are six of said eight elongated electrodes, said six input electrodes comprising a first group of three adjacent input electrodes and a second group of three electrodes positioned to be symmetric with said first group of three adjacent input electrodes, when viewed with reference to said central axis of said rod;
said driving signal is supplied to said first group of three adjacent input electrodes with a given phase;
said driving signal is supplied to said second group of three electrodes with a phase that is opposite to said given phase; and
said output electrodes are a remaining two of said elongated electrodes which are not input electrodes.

7. A piezoelectric vibrator as claimed in claim 1, wherein said plurality of elongated electrodes comprises an odd number of elongated electrodes, said odd number of elongated electrodes being located at equiangularly spaced positions within an angular region of 360 angular degrees × $\frac{2}{3}$, on said circular cylindrical outer surface of said circular rod.

8. A piezoelectric vibrator as claimed in claim 7, wherein five elongated electrodes are formed on said circular cylindrical outer surface of said circular rod.

9. A piezoelectric vibrator as claimed in claim 8, wherein:
a central one of said five elongated electrodes has two elongated electrodes positioned respectively on a first and a second side of said central one of said elongated electrodes, said input electrodes are respectively first and second ones of said five elongated electrodes that are respectively positioned adjacent to said central one of said elongated electrodes;
said predetermined diametric direction is along a plane that connects a center of said central one of said elongated electrodes and said central axis of said circular rod; and
said output electrodes include at least said particular odd-numbered one of said elongated electrodes.

10. A gyroscope system comprising:
a piezoelectric vibrator including:
a circular rod formed of a piezoelectric material, said circular rod having a circular cylindrical outer surface and a central axis extending along a longitudinal direction of said circular rod;
said circular rod being simultaneously bendable and vibratable in any preselected radial direction at a resonant frequency thereof;
a plurality of elongated electrodes formed on said outer surface of said circular rod, said plurality of elongated electrodes being formed in parallel with each other and extending in the direction of said central axis of said circular rod;
said circular rod being polarized by said plurality of elongated electrodes in a direction away from a particular odd-numbered one of said plurality of elongated electrodes and in a direction away from at least one other odd-numbered one of said plurality of elongated electrodes, when counted in a direction away from said particular odd-numbered one of said plurality of elongated electrodes, and in a direction toward at least a given even-numbered one of said plurality of elongated electrodes, when counted in said direction away from said particular odd-numbered one of said plurality of elongated electrodes, said at least a given even-numbered one of said plurality of elongated electrodes being positioned adjacent to at least one odd-numbered one of said plurality of elongated electrodes, including said particular odd-numbered one of said plurality of elongated electrodes;
driving means for supplying a driving signal, having a frequency corresponding to said resonant frequency, to predetermined ones of said plurality of elongated electrodes, said predetermined ones of said plurality of elongated electrodes being input electrodes to simultaneously bend and vibrate said circular rod in a predetermined diametric direction and in said preselected radial direction;
specific ones of said plurality of elongated electrodes being output electrodes for providing a plurality of output signals, said specific ones of said plurality of elongated electrodes being those ones of said plurality of elongated electrodes that are positioned symmetrically with respect to said predetermined diametric direction, said output signals being produced in response to vibrations of said circular rod caused by a Coriolis' force that is generated by a rotation of said circular rod at a rotational speed; and
means coupled with said output electrodes of said plurality of elongated electrodes, responsive to said output signals, for producing a detected signal representative of said rotational speed.

11. A gyroscope system as claimed in claim 10, wherein said piezoelectric vibrator comprises an even number of elongated electrodes located at equiangularly spaced positions on said circular cylindrical outer surface of said circular rod.

12. A gyroscope system as claimed in claim 11, wherein:

six elongated electrodes are formed on said circular rod; said plurality of input electrodes includes three input electrodes that are supplied with said driving signals, said three input electrodes being positioned adjacent to each other;

said predetermined diametric direction being in a direction that extends along a plane that connects a center of a central one said three adjacent input electrodes and said central axis of said circular rod; and said output electrodes comprising three output electrodes that are positioned symmetrically with respect to said three adjacent input electrodes when viewed with reference to plane that is perpendicular to said predetermined diametric direction.

13. A gyroscope system as claimed in claim 12, further comprising control means for controllably changing a voltage level of said driving signal, said driving signal being supplied to two non-adjacent opposing input electrodes of said three adjacent input electrodes when viewed with reference to a central one said three adjacent input electrodes.

14. A gyroscope system as claimed in claim 10, wherein:

eight elongated electrodes are formed on said circular rod;

said plurality of input electrodes being six of said eight elongated electrodes to thereby provide six input electrodes, said six input electrodes being formed into a first group of three adjacent electrodes, and a second group of the three electrodes positioned to be symmetric with respect to said first group of three electrodes when viewed with reference to said central axis of said circular rod;

said driving signal is supplied to said first group of three adjacent input electrodes with given phase;

said driving signal is supplied to said second group of three input electrodes with a phase that is opposite to said given phase; and said output electrodes are a remaining two of said eight elongated electrodes that are not input electrodes.

15. A gyroscope system as claimed in claim 10, wherein said piezoelectric vibrator comprises an odd number of electrodes located at equiangularly spaced positions within an angular region of 360 angular degrees $\times \frac{2}{3}$, on said outer surface of said circular rod.

16. A gyroscope system as claimed in claim 15 wherein:

five elongated electrodes are formed on said circular rod, said five elongated electrodes including a central elongated electrode and two elongated electrodes respectively positioned on a first and second side central elongated electrode, said input electrodes being first and second ones of said five elongated electrodes that are positioned to be adjacent to said central elongated electrode on said first and second sides of said central electrode, said predetermined diametric direction being positioned along a plane which connects a center of said central elongated electrode and said central axis of said circular rod; and said respective output electrodes being said specific ones of said plurality of elongated electrodes that include at least said particular odd-numbered one of said elongated electrodes.

17. A piezoelectric vibrator for use in a gyroscope, comprising:

a circular rod formed of a piezoelectric material, said circular rod having a circular cylindrical outer surface and a central axis extending along a longitudinal direction of said circular rod;

said circular rod being simultaneously bendable and vibratable in any preselected radial direction at a resonant frequency thereof;

an odd-numbered plurality of elongated electrodes formed on said outer surface of said circular rod, said odd-numbered plurality of elongated electrodes being formed in parallel with each other and extending in the direction of said central axis of said circular rod;

said circular rod being polarized in a direction away from a particular odd-numbered one of said odd-numbered plurality of elongated electrodes and in a direction away from at least one other odd-numbered one of said odd-numbered plurality of elongated electrodes, when counted in a direction away from said particular odd-numbered one of said plurality of odd-numbered elongated electrodes, and in a direction toward at least a given even-numbered one of said odd-numbered plurality of elongated electrodes, when counted in said direction away from said particular odd-numbered one said odd-numbered plurality of elongated electrodes, said at least a given even-numbered one of said odd-numbered plurality of elongated electrodes being positioned adjacent to at least one odd-numbered one of said odd-numbered plurality of elongated electrodes, including said particular odd-numbered one of said odd-numbered plurality of elongated electrodes;

at least two of said odd-numbered plurality of elongated electrodes being input electrodes for receiving a driving signal, said driving signal having a frequency corresponding to said resonant frequency, for vibrating said circular rod in a predetermined diametric direction and for simultaneously bending and vibrating said circular rod in said preselected radial direction;

at least two of said plurality of odd-numbered elongated electrodes being output electrodes for providing respective output signals, said output signals being formed by vibrations caused by a Coriolis' force generated by a rotation of said circular rod at a rotational speed; and said odd number plurality of elongated electrodes being located at equiangularly spaced positions within an angular region of 360 angular degrees $\times \frac{2}{3}$, on said circular cylindrical outer surface of said circular rod.

18. A piezoelectric vibrator as claimed in claim 17, wherein five elongated electrodes are formed on said circular cylindrical outer surface of said circular rod.

19. A gyroscope system comprising:

a piezoelectric vibrator including:

a circular rod formed of a piezoelectric material, said circular rod having a circular cylindrical outer surface and a central axis extending along a longitudinal direction of said circular rod;

said circular rod being simultaneously bendable and vibratable in any preselected radial direction at a resonant frequency thereof;

six elongated electrodes, formed on said outer surface of said circular rod at equiangularly spaced positions on said circular rod, said six elongated electrodes being formed in parallel with each other and extending in the direction of said central axis of said circular rod;

said circular rod being polarized in a direction away from a particular odd-numbered one of said six elongated electrodes and in a direction away from at least one other odd-numbered one of said six elongated electrodes, when counted in a direction away from said particular odd-numbered one of said six elongated electrodes, and in a direction toward at least a given even-numbered one of said six elongated electrodes, when counted in said direction away from said particular odd-numbered one of said six elongated electrodes, said at least a given even-numbered one of said six elongated electrodes being positioned adjacent to at least one odd-numbered one of said six elongated electrodes, including said particular odd-numbered one of said six elongated electrodes;

driving means for supplying a driving signal, having a frequency corresponding to said resonant frequency, to three adjacent input electrodes of said six elongated electrodes to simultaneously bend and vibrate said circular rod in a predetermined diametric direction and in said preselected radial direction;

specific ones of said six elongated electrodes being output electrodes for providing a plurality of output signals, said output signals being produced in response to vibrations of said circular rod caused by a Coriolis' force that is generated by a rotation of said circular rod at a rotational speed;

means coupled with said output electrodes, responsive to said output signals, for producing a detected signal representative of said rotational speed;

said predetermined diametric direction being in a direction that extends along a plane that connects a center of a central one of said three adjacent input electrodes and said central axis of said circular rod; and said output electrodes comprising three output electrodes that are positioned symmetrically with respect to said three adjacent input electrodes when viewed with reference to a plane that is perpendicular to said predetermined diametric direction.

20. A gyroscope system as claimed in claim 19, further comprising control means for controllably changing a voltage level of said driving signal, said driving signal being supplied to two non-adjacent opposing input electrodes of said three adjacent input electrodes when viewed with reference to a central one of said three adjacent input electrodes.

21. A piezoelectric vibrator as claimed in claim 19, wherein:
said six elongated electrodes includes a group of three adjacent input electrodes;
said predetermined diametric direction is along a plane which connects a center of a central one of said three adjacent input electrodes and said central axis of said circular rod; and
said output electrodes comprise three output electrodes that are positioned to be symmetric with said three adjacent input electrodes when viewed with respect to a plane that is perpendicular to said predetermined diametric direction.

22. A gyroscope system comprising:
a piezoelectric vibrator including:
a circular rod formed of a piezoelectric material, said circular rod having a circular cylindrical outer surface and a central axis extending along a longitudinal direction of said circular rod;

said circular rod being simultaneously bendable and vibratable in any preselected radial direction at a resonant frequency thereof;

eight elongated electrodes, formed on said outer surface of said circular rod at equiangularly spaced positions on said circular rod, said eight elongated electrodes being formed in parallel with each other and extending in the direction of said central axis of said circular rod;

said circular rod being polarized in a direction away from a particular odd-numbered one of said eight elongated electrodes and in a direction away from at least one other odd-numbered one of said eight elongated electrodes, when counted in a direction away from said particular odd-numbered one of said eight elongated electrodes, and in a direction toward at least a given even-numbered one of said eight elongated electrodes, when counted in said direction away from said particular odd-numbered one of said eight elongated electrodes, said at least a given even-numbered one of said eight elongated electrodes being positioned adjacent to at least one odd-numbered one of said eight elongated electrodes, including said particular odd-numbered one of said eight elongated electrodes;

driving means for supplying a driving signal, having a frequency corresponding to said resonant frequency, to six input electrodes among said eight elongated electrodes to simultaneously bend and vibrate said circular rod in a predetermined diametric direction and in said preselected radial direction;

a remaining two of said eight elongated electrodes being output electrodes for providing a plurality of output signals, said output signals being produced in response to vibrations of said circular rod caused by a Coriolis' force that is generated by a rotation of said circular rod at a rotational speed;

means coupled with said output electrodes, responsive to said output signals, for producing a detected signal representative of said rotational speed;

said six input electrodes being formed into a first group of three adjacent input electrodes, and a second group of three adjacent input electrodes positioned to be symmetric with respect to said first group of three adjacent input electrodes when viewed with reference to said central axis of said circular rod;

said driving signal being supplied to said first group of three adjacent input electrodes with a given phase; and said driving signal being supplied to said second group of three adjacent input electrodes with a phase that is opposite to said given phase.

23. A gyroscope system comprising:
a piezoelectric vibrator including:
a circular rod formed of a piezoelectric material, said circular rod having a circular cylindrical outer surface and a central axis extending along a longitudinal direction of said circular rod;

said circular rod being simultaneously bendable and vibratable in any preselected radial direction at a resonant frequency thereof;

an odd-numbered plurality of elongated electrodes, greater than three, formed on said outer surface of said circular rod, said odd-numbered plurality of elongated electrodes being formed in parallel with each other and extending in the direction of said central axis of said circular rod;

said circular rod being polarized in a direction away from a particular odd-numbered one of said odd-numbered plurality of elongated electrodes and in a direction away from at least one other odd-numbered one of said odd-numbered plurality of elongated electrodes, when counted in a direction away from said particular odd-numbered one of said odd-numbered plurality of elongated electrodes, and in a direction towards at least a given even-numbered one of said odd-numbered plurality of elongated electrodes, when counted in said direction away from said particular odd-numbered one of said odd-numbered plurality of elongated electrodes, said at least a given even-numbered one of said odd-numbered plurality of elongated electrodes being positioned adjacent to at least one odd-numbered one of said odd-numbered plurality of elongated electrodes, including said particular odd-numbered one of said odd-numbered plurality of elongated electrodes;

driving means for supplying a driving signal, having a frequency corresponding to said resonant frequency, to a plurality of input electrodes selected from said plurality of odd-numbered elongated electrodes to simultaneously bend and vibrate said circular rod in a predetermined diametric direction and in said preselected radial direction;

specific ones of said odd-numbered plurality of elongated electrodes being output electrodes for providing a plurality of output signals, said output signals being produced in response to vibrations of said circular rod caused by a Coriolis' force that is generated by a rotation of said circular rod at a rotational speed;

means coupled with said output electrodes responsive to said output signals, for producing a detected signal representative of said rotational speed;

said odd numbered plurality of elongated electrodes being located at equiangularly spaced positions within an angular region of 360 angular degrees $\times \frac{2}{3}$, on said outer surface of said circular rod.

24. A gyroscope system as claimed in claim 23, wherein:

five elongated electrodes are formed on said circular rod, said five elongated electrodes including a central elongated electrode and two elongated electrodes respectively positioned on a first and a second sides of said central elongated electrode, said input electrodes being selected to be first and second ones of said five elongated electrodes that are positioned to be adjacent to said central elongated electrode on said first and second sides of said central electrode, said predetermined diametric direction being positioned along a plane which connects a center of said central elongated electrode and said central axis of said circular rod; and said output electrodes are said specific ones of said plurality of elongated electrodes that include at least said particular odd-numbered one of said five elongated electrodes.

* * * * *